(12) United States Patent
Takada et al.

(10) Patent No.: US 8,919,319 B2
(45) Date of Patent: Dec. 30, 2014

(54) PISTON FOR INTERNAL COMBUSTION ENGINE

(75) Inventors: Ryotaro Takada, Utsunomiya (JP); Mayumi Saruyama, Utsunomiya (JP); Yositaka Tsujii, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/635,182

(22) PCT Filed: Mar. 16, 2011

(86) PCT No.: PCT/JP2011/056164
§ 371 (c)(1),
(2), (4) Date: Sep. 14, 2012

(87) PCT Pub. No.: WO2011/115152
PCT Pub. Date: Sep. 22, 2011

(65) Prior Publication Data
US 2013/0000592 A1    Jan. 3, 2013

(30) Foreign Application Priority Data

Mar. 19, 2010 (JP) ................................ 2010-064106
Mar. 19, 2010 (JP) ................................ 2010-064109
Mar. 19, 2010 (JP) ................................ 2010-064115
Feb. 25, 2011 (JP) ................................ 2011-039660

(51) Int. Cl.
*F02F 3/00* (2006.01)
*F16J 1/01* (2006.01)
*F16J 1/04* (2006.01)
*F16J 1/08* (2006.01)

(52) U.S. Cl.
CPC .... *F16J 1/01* (2013.01); *F16J 1/04* (2013.01); *F16J 1/08* (2013.01)
USPC .................................................... 123/193.6

(58) Field of Classification Search
USPC ...................................................... 123/193.6
See application file for complete search history.

(56) References Cited

U.S. PATENT DOCUMENTS 4,030,045 A * 6/1977 Clark ............................ 331/1 A
4,538,562 A * 9/1985 Matsui et al. .............. 123/90.51
(Continued)

FOREIGN PATENT DOCUMENTS

CN        1721679 A      1/2006
GB     2 367 522 A       4/2002
(Continued)

OTHER PUBLICATIONS

Chinese Office Action dated Feb. 17, 2014 and partial English translation of pertinent portion, issued over corresponding Chinese Patent Application No. 201180014270.2.

*Primary Examiner* — Lindsay Low
*Assistant Examiner* — Charles Brauch
(74) *Attorney, Agent, or Firm* — Rankin, Hill & Clark LLP

(57) ABSTRACT

Provided is an aluminum alloy piston for an internal combustion engine. In the internal combustion engine, the piston moves back and forth in a sleeve made of grey cast iron or an aluminum alloy. Further, the piston, which is made from silver, silver alloy, copper, or copper alloy, is provided with a film that covers the scoring that is formed on the piston skirt and there are undulations in the surface of the film, formed from protrusions and depressions. There is a difference of 8-15 μm between the lowest point of the depressions and the highest point of the protrusions. The pitch of adjacent protrusions corresponds to the pitch of projections in the scoring. In addition, the arithmetic average roughness (Ra) of the protrusion peaks does not exceed 60 nm.

8 Claims, 20 Drawing Sheets

(56) References Cited

U.S. PATENT DOCUMENTS

| | | | |
|---|---|---|---|
| 5,816,088 A * | 10/1998 | Yamada et al. | 72/53 |
| 6,303,014 B1 * | 10/2001 | Taylor et al. | 205/103 |
| 6,684,844 B1 | 2/2004 | Wang et al. | |
| 7,051,645 B2 | 5/2006 | Schenkel et al. | |
| 2005/0069724 A1 * | 3/2005 | Obara | 428/544 |
| 2005/0087166 A1 * | 4/2005 | Rein et al. | 123/193.4 |
| 2007/0201122 A1 * | 8/2007 | Dozeman et al. | 359/265 |
| 2007/0218303 A1 * | 9/2007 | Ogawa et al. | 428/472.2 |
| 2009/0051122 A1 * | 2/2009 | Tamegai et al. | 277/434 |
| 2010/0109159 A1 * | 5/2010 | Ho et al. | 257/737 |
| 2011/0064937 A1 * | 3/2011 | Mukoyama et al. | 428/312.6 |
| 2012/0180747 A1 * | 7/2012 | Domanchuk et al. | 123/193.6 |

FOREIGN PATENT DOCUMENTS

| | | |
|---|---|---|
| JP | 2000-202612 A | 7/2000 |
| JP | 2003-013799 A | 1/2003 |
| JP | 2003-013802 A | 1/2003 |
| JP | 2008-215222 A | 9/2008 |
| JP | 2009-068584 A | 4/2009 |

* cited by examiner

PISTON FOR INTERNAL COMBUSTION ENGINE

CROSS-REFERENCED TO RELATED APPLICATION

This application is a National Stage entry of International Application PCT/JP2011/056164, filed Mar. 16, 2011, which claims priority to Japanese Patent Application No. 2010-064106, filed Mar. 19, 2010, Japanese Patent Application No. 2010-064109, filed Mar. 19, 2010, Japanese Patent Application No. 2010-064115, filed Mar. 19, 2010, and Japanese Patent Application No. 2011-039660, filed Feb. 25, 2011, the disclosure of the prior applications are hereby incorporated in their entirety by reference.

TECHNICAL FIELD

The present invention relates to a piston for an internal combustion engine, which undergoes reciprocating motion in a sleeve of the internal combustion engine.

BACKGROUND ART

Automobiles are propelled by tires, which are rotated by rotational drive power converted from drive power generated by an internal combustion engine supplied with fuel. Various attempts have been made recently to increase the fuel consumption rate (mileage) of internal combustion engines in such automobiles, since a reduction in the amount of consumed fuel makes the engines energy efficient and contributes to the environmental protection of the earth.

One of such attempts involves reducing the sliding resistance between sleeves in an internal combustion engine and the pistons that are reciprocally moved in the sleeves. Such reduced sliding resistance allows the piston to move back and forth more easily. Therefore, the drive force required for the piston to undergo reciprocating movement is reduced, thereby resulting in a reduction in the amount of consumed fuel.

Sliding resistance may be lowered by depositing a layer containing a highly lubricative substance on a sleeve or a piston skirt in order to increase the lubricating ability of the sleeve or the piston skirt. For example, according to Japanese Laid-Open Patent Publication No. 2009-068584, it has been proposed to provide a layer of binder resin with $MoS_2$, C, or the like dispersed therein.

The applicant has further proposed, in Japanese Laid-Open Patent Publication No. 2003-013802, to form line marks on a piston skirt, and to grow over the surface of the line marks an anodic oxide coating, which is impregnated with a lubricant and a molybdenum disulfide coating successively in this order.

SUMMARY OF INVENTION

Internal combustion engines contain lubricating oil, which is present between the sleeve and the piston skirt. Internal combustion engines are thus required not only to reduce sliding resistance, but also to have an excellent ability to retain such lubricating oil. If the ability to retain lubricating oil is poor, then the internal combustion engines are liable to suffer from a seizure.

A general object of the present invention is to provide a piston for an internal combustion engine, which is simple in structure yet capable of reducing the sliding resistance between the piston and a sleeve.

A main object of the present invention is to provide a piston for an internal combustion engine, which is able to sufficiently retain lubricating oil.

Another object of the present invention is to provide a piston for an internal combustion engine, which contributes to increasing mileage while also avoiding seizure of the internal combustion engine.

According to an embodiment of the present invention, there is provided a piston for an internal combustion engine, which is made of an aluminum alloy and is reciprocally movable in a sleeve made of gray cast iron or an aluminum alloy, comprising:

a coating made of silver, a silver alloy, copper, or a copper alloy, the coating covering line marks on a piston skirt, wherein:

the coating includes a surface having an undulation therein including recesses and ridges;

a height difference between lowest valleys of the recesses and highest crests of the ridges ranges from 8 to 15 μm; and a pitch between adjacent ones of the ridges corresponds to a pitch between ridges of the line marks, and the crests of the ridges have an arithmetically averaged roughness Ra of 60 nm or smaller.

Heretofore, a conventional $MoS_2$ lubricating layer has included minute surface irregularities on the crests of the ridges of the aforementioned undulation. According to the present invention, the crests of the ridges of the undulation provide a flat smooth surface as a whole.

When the piston skirt is held in sliding contact with the sleeve, the crests of the ridges function as an actual sliding surface. With an $MoS_2$ lubricating layer, which has surface irregularities on the crests, therefore, the area of the actual sliding surface is small. In contrast, according to the present invention, the smooth surface referred to above functions as an actual sliding surface, and hence the area of the sliding surface is large. According to the present invention, therefore, stresses acting on the sliding surface are appropriately distributed. Consequently, the frictional resistance between the piston skirt and the sleeve is reduced.

As described above, the frictional resistance between the piston skirt and the sleeve is reduced due to the fact that the crests of the ridges of the undulation on the coating on the piston skirt provide a flat smooth surface, as a result of having an arithmetically averaged roughness Ra of 60 nm or smaller.

The sum of the thermal conductivity of a sleeve interface and the thermal conductivity of a piston skirt interface is 350 W/m·K or higher. Accordingly, frictional heat generated between the sleeve and the piston is quickly spread or transferred. Therefore, the region between the sleeve and the piston is prevented from becoming heated to a high temperature. Since silver, silver alloy, and copper, which the coating may be made of, have high melting points, the coating can easily be kept in a solid-phase state even in the presence of frictional heat. For the above reasons combined together, adhesion of the piston skirt is prevented.

The force required to cause the piston to slide against the sleeve is reduced. This is due to the fact that, since the absolute value of the difference between respective Young's moduli of the piston and the sleeve is 10 GPa or greater, the sliding interface of the piston skirt is liable to become elastically deformed, thereby allowing minute surface irregularities to be displaced and smoothed when loads are applied thereto. Thus, when the piston slides against the sleeve, a shearing force generated along the direction of such sliding movement, or stated otherwise, sliding resistance, is reduced.

In addition, since lubricating oil is retained in the recesses of the undulation, the piston has an excellent lubricating oil retaining capability.

The sliding resistance is thus prevented from increasing. Furthermore, since adhesion of the piston skirt is prevented, the piston skirt develops a smooth frictional surface, resulting in a reduction in surface pressure. Inasmuch as the sliding resistance between the piston and the sleeve is reduced, the sliding region is prevented from suffering from damage such as scratches and scuffs.

The smooth frictional surface, which is produced as described above, increases a load (hereinafter referred to as a boundary transition load) required to bring the sleeve and the piston skirt into contact with each other. This implies that the sleeve and the piston skirt will not be brought into direct contact with each other unless a large load is applied thereto.

It is therefore easy to retain the lubricant between the sleeve and the piston skirt. This also makes it easy to avoid seizure between the sleeve and the piston skirt.

The coating may comprise a metal layer made of silver or copper. However, the coating may also comprise a layer in the form of a sintered body made up of particles of silver, or an alloy layer containing silver. Suitable examples of such a silver alloy include an alloy of silver and tin, an alloy of silver and copper, etc.

At any rate, if the coating is made of a silver alloy, then the purity of silver in the coating preferably is 60% by weight or higher. The purity of silver thus selected is effective at reducing frictional loss. More preferably, the purity of the silver in the coating is 80% by weight or higher.

The coating preferably has a thickness ranging from 0.5 to 100 μm. If the coating has an excessively small thickness, then since the coating becomes worn down in a relatively short period of time, it is difficult to make the frictional surface of the crests of the line marks (the ridges of the undulation) into a smooth surface, which exhibits a surface roughness of 60 nm or smaller. On the other hand, if the coating has an excessively large thickness, then since the weight of the coating is increased, a large drive force is required to reciprocally move the piston.

The line marks preferably have a height ranging from 0.001 to 0.1 mm, and the pitch between adjacent ones of the ridges of the line marks preferably ranges from 0.1 to 0.5 mm. With the line marks being dimensioned in this manner, the area of contact between the piston skirt and the sleeve falls within an appropriate range. Accordingly, sliding resistance is prevented from increasing, and seizures are prevented from occurring.

DESCRIPTION OF EMBODIMENTS

A piston for an internal combustion engine according to a preferred embodiment of the present invention will be described in detail below with reference to the accompanying drawings.

First, a relationship between respective Young's moduli and a coefficient of friction between two objects will be described below.

Figure 1:
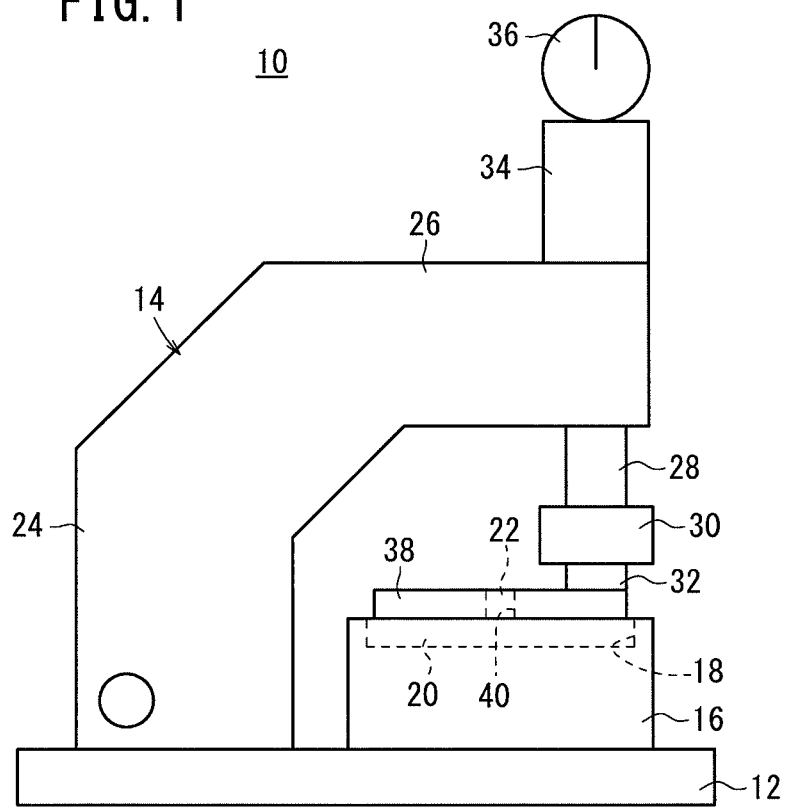
FIG. 1 is a schematic side elevational view of a sliding friction tester.

As shown in FIG. 1, when two objects slide against each other, the coefficient of friction thereof can be measured by a sliding friction tester 10. The sliding friction tester 10 will briefly be described below. The sliding friction tester 10 includes a base 12, together with an arm 14 and a rest 16, which are mounted on the base 12.

The rest 16 has a housing recess 18 defined in an upper end surface thereof in which a rotary table 20 is accommodated. The rotary table 20 is rotated by a non-illustrated rotational drive mechanism (e.g., a motor). A support shaft 22 projects centrally from an upper end surface of the rotary table 20.

The arm 14 has an upstanding member 24, which is erected substantially vertically from the base 12, and a holder 26, which bends from the upstanding member 24 toward the base 12 and extends over the base 12.

A pressing shaft 28 is vertically movably supported on the holder 26. The pressing shaft 28 has a tip end with a pressing member 30 fitted thereover, the pressing member 30 being slightly larger in diameter than the pressing shaft 28.

Loads applied from a test piece 32 (to be described later) to the pressing shaft 28 are detected by a load cell 34. An indicator 36 for indicating the detected load is disposed on the top of the load cell 34.

The support shaft 22 supports a disk 38 thereon. More specifically, the disk 38 has a penetrating insertion hole 40 defined centrally therein. The support shaft 22 on the rotary table 20 is inserted in the insertion hole 40. The disk 38 is placed on the rotary table 20. Upon rotation of the rotary table 20, the disk 38 rotates in unison with the rotary table 20.

The test piece 32 is interposed between the disk 38 and the pressing member 30. The sliding friction tester 10 serves to determine the coefficient of friction between the test piece 32 and the disk 38.

More specifically, after the disk 38 has been placed on the rotary table 20, with the support shaft 22 on the rotary table 20 being inserted into the insertion hole 40 in the disk 38, the test piece 32 is placed on the disk 38. The pressing shaft 28 then is lowered, so as to cause the pressing member 30 to press against the test piece 32 under a prescribed pressure.

Then, the rotary table 20 is rotated by the rotational drive mechanism, thereby rotating the disk 38. As a result, the disk 38 starts sliding against the test piece 32.

At this time, the load, which is transmitted from the test piece 32 to the pressing shaft 28 and the pressing member 30, is detected by the load cell 34, and the load is indicated by the indicator 36.

The coefficient of friction is calculated based on the determined load and the rotational drive force of the rotational drive mechanism at the time that the disk 38 begins rotating.

Figure 2:
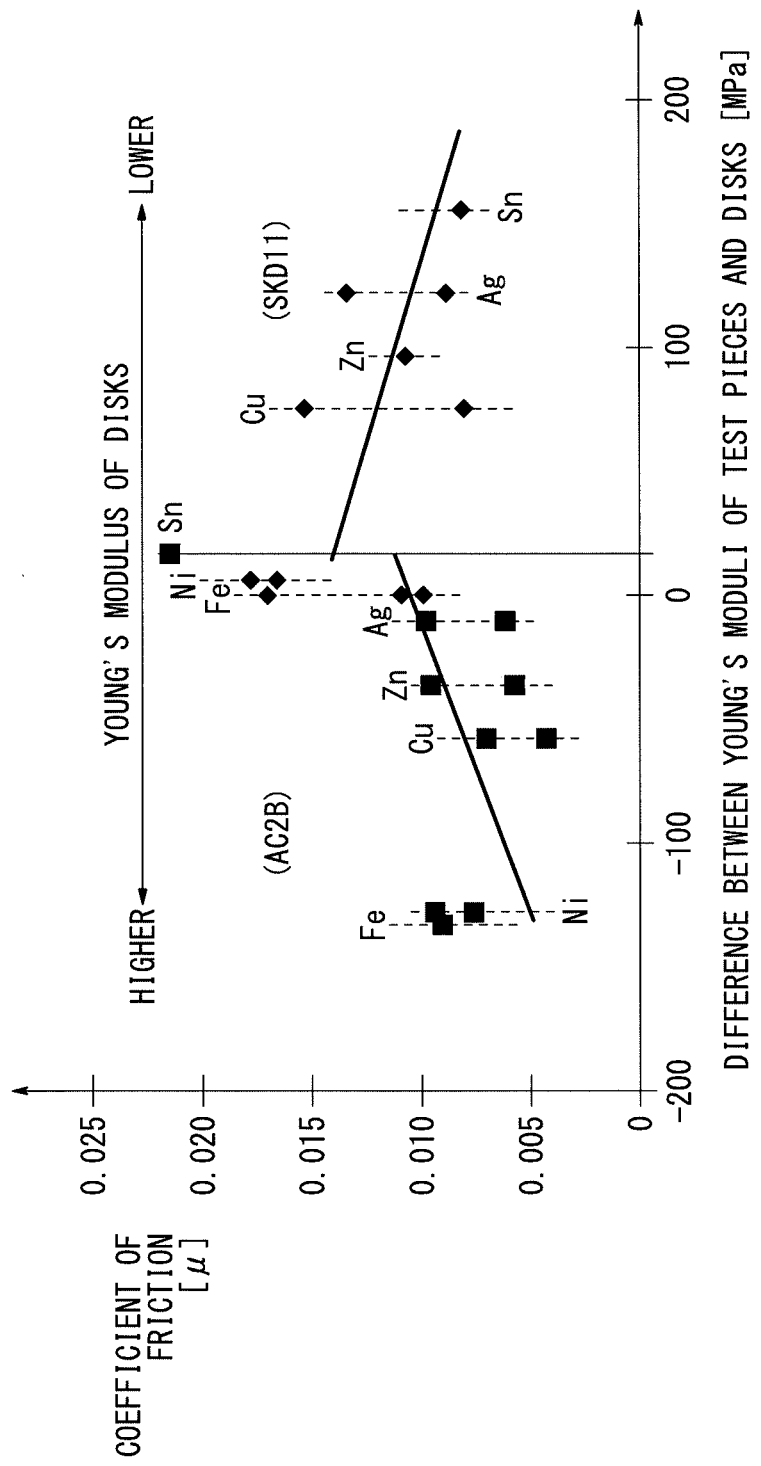
FIG. 2 is a graph showing a relationship between coefficients of friction determined using disks and test pieces, and values produced by subtracting Young's moduli of the test pieces from Young's moduli of the disks.
Figure 7:
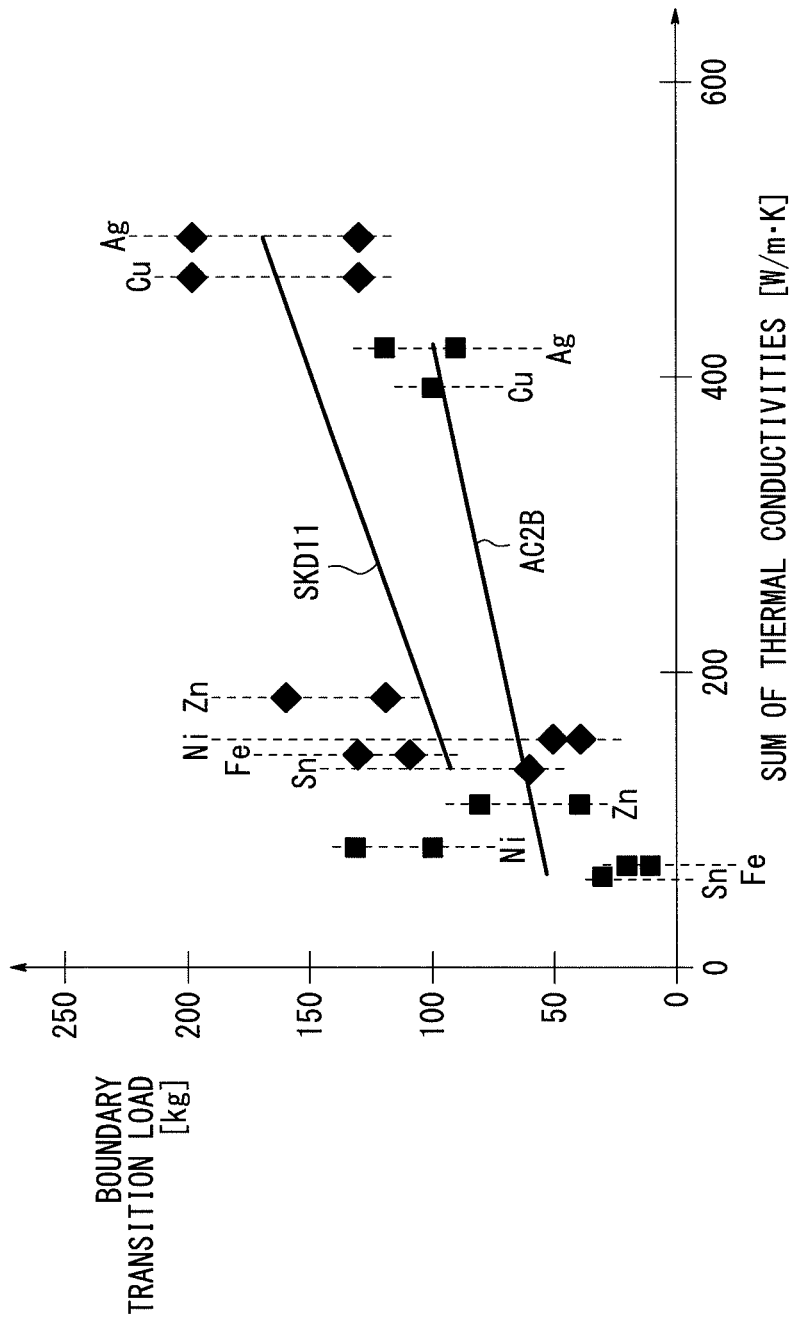
FIG. 7 is a graph showing a relationship between sums of thermal conductivities of disks and test pieces, and boundary transition loads of the disks and the test pieces.

FIG. 2 is a graph showing a relationship between coefficients of friction determined using disks 38, which are made of AC2B (JIS indicative of an aluminum alloy) or SKD11 (JIS indicative of a die steel), and test pieces 32 of various materials, and values produced by subtracting the Young's moduli of the test pieces from the Young's moduli of the disks 38. In FIG. 2, the square-shaped marks (■) represent results of the disks 38 made of AC2B, whereas the lozenge-shaped marks (♦) represent results of the disks 38 made of SKD11. The materials of the test pieces 32 are shown in FIG. 2. FIG. 2 also shows individual results obtained when respective test pieces 32 of the same material are measured a plurality of times. FIG. 7 also shows such individual results.

It can be seen from FIG. 2 that the coefficient of friction becomes smaller as the absolute value of the difference between the Young's moduli is greater. The reason for such a phenomenon appears to be that, as the difference between the Young's moduli becomes greater, the sliding surfaces are elastically deformed relatively easily, thereby resulting in a reduction in shearing force upon sliding movement, so that the sliding resistance thereof is reduced. This implies that, as the difference between the Young's moduli becomes greater, the force required to cause the two objects to slide relatively to each other is smaller.

On the other hand, if the two objects exhibit good thermal conductivity, then frictional heat generated when the objects slide against each other is quickly transferred. Therefore, the two objects, which slide against each other, are less liable to adhere to one another. Further details concerning this phenomenon will be described below.

Figure 3:
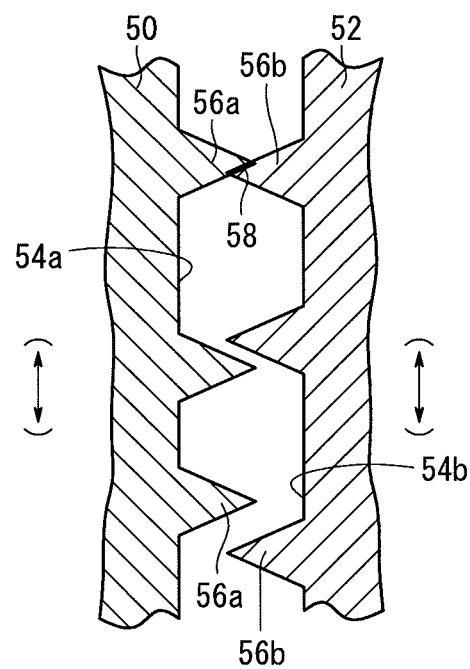
FIG. 3 is an enlarged fragmentary cross-sectional view of sliding surfaces of a first member and a second member, which exhibit poor thermal conductivity.

FIG. 3 schematically shows two objects, i.e., a first member 50 and a second member 52, having respective sliding surfaces (sliding regions). Before the first member 50 and the second member 52 are made to slide against each other, microscopically observed sliding surfaces thereof are not smooth, but rather are irregular due to a number of concavities 54a, 54b and convexities 56a, 56b contained therein. When the second member 52 slides against the first member 50, local portions of the convexities 56a on the sliding surface of the first member 50 and the convexities 56b on the sliding surface of the second member 52 are brought into contact with each other.

When local portions of the convexities 56a, 56b are brought into contact with each other, such portions generate heat locally. If the thermal conductivity of the first member 50 and the second member 52 is too small, then the generated heat tends to remain within the first member 50 and the second member 52 rather than being spread out. Therefore, the local portions of the convexities 56a, 56b, which are brought into contact with each other, become higher in temperature. If the first member 50 and the second member 52 have a low melting point, then the local portions of the convexities 56a, 56b, which are brought into contact with each other, are melted.

When the melted local portions are resolidified, the local portions become united together integrally, or become adhered to each other, resulting in an adhered region 58, as shown in FIG. 3. This phenomenon tends to occur as the thermal conductivity of the first and second members 50, 52 is smaller, or as the melting point of the first and second members 50, 52 is lower.

If adhesion between the convexities 56a, 56b occurs, a force is required to separate the convexities 56a, 56b away from each other. When the convexities 56a, 56b, which have been separated from each other upon sliding movement of the second member 52 against the first member 50, are brought into contact with each other again, the convexities 56a, 56b tend to adhere to each other again, and will subsequently be separated from each other. Therefore, a large force is required in order to cause the second member 52 to slide against the first member 50. Since the adhered region 58 is repeatedly broken to separate the convexities 56a, 56b from each other, the sliding surface of the first member 50 or the sliding surface of the second member 52 becomes damaged, and hence smoothly worn surfaces are not formed on the first member 50 and the second member 52. Stated otherwise, the convexities 56a, 56b exhibit a sliding structure in which an input load is borne by the protrusions.

Figure 4:
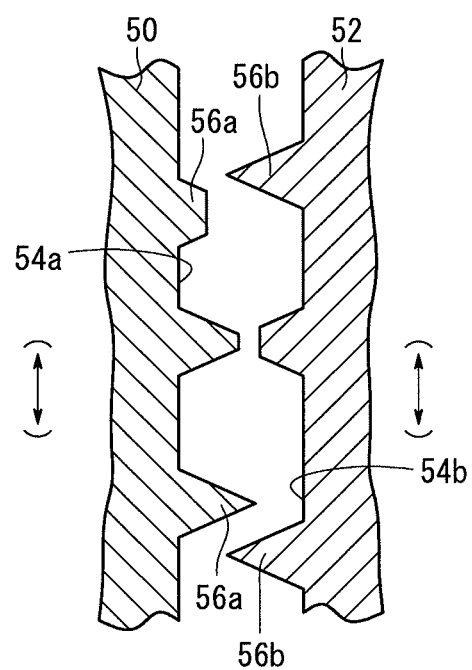
FIG. 4 is an enlarged fragmentary cross-sectional view of sliding surfaces of a first member and a second member, which exhibit good thermal conductivity.

If the thermal conductivity of the first member 50 and the second member 52 is large, then heat generated by the adhered region 58 spreads into the first member 50 or the second member 52. Therefore, the adhered region 58 is prevented from becoming higher in temperature, and the convexities 56a, 56b, which are in contact with each other, are ground without becoming adhered to each other, as shown in FIG. 4.

Since the first member 50 and the second member 52 are easily worn, relatively smooth sliding surfaces are produced. The areas of the sliding regions of the first member 50 and the second member 52 are increased, thereby resulting in a reduction in sliding resistance. Since adhered regions therebetween are not repeatedly broken, scratches and scuffs are prevented from occurring in the sliding surface of the first member 50 and the sliding surface of the second member 52, i.e., the sliding surfaces are prevented from being damaged.

As the absolute value of the value produced by subtracting the Young's modulus of the second member 52 from the Young's modulus of the first member 50 becomes greater, the convexities 56a, 56b are more likely to become elastically deformed, thereby making the sliding surfaces of the first member 50 and the second member 52 smoother, i.e., resulting in a greater reduction in sliding resistance.

Figure 5:
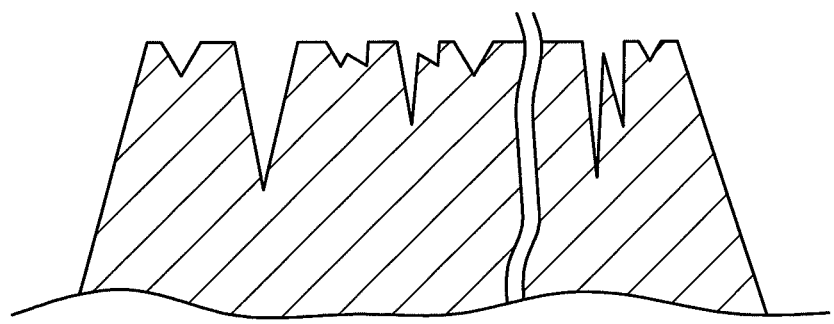
FIG. 5 is an enlarged view of a crest of convexities of the first member and the second member shown in FIG. 3.

As can be understood from the above description, on conventional sliding surfaces, after the first member 50 and the second member 52 have slid against each other, the crests of the convexities 56a, 56b are not flat, but have small surface irregularities therein, as shown microscopically in FIG. 5.

On the other hand, if the sum of the thermal conductivities of the first member 50 and the second member 52 is large, and assuming that the first member 50 and the second member 52 have high melting points, then heat generated when the first member 50 and the second member 52 are worn is quickly spread and transferred, and the first member 50 and the second member 52 are kept in a solid-phase state. Since the sliding surfaces thereof are less liable to become adhered to each other, flat worn surfaces are produced on the first member 50 and the second member 52. As a consequence, the load required to bring the first member 50 and the second member 52 into direct contact with each other, i.e., the boundary transition load, is large.

As the sliding surfaces become smoother, the load applied to the sliding surfaces is more likely to be spread in a substantially uniform manner. Thus, if a lubricant is present between the first member 50 and the second member 52, then forces tending to shear the lubricant are reduced. Therefore, the lubricant is suitably retained between the first member 50 and the second member 52.

Figure 6:
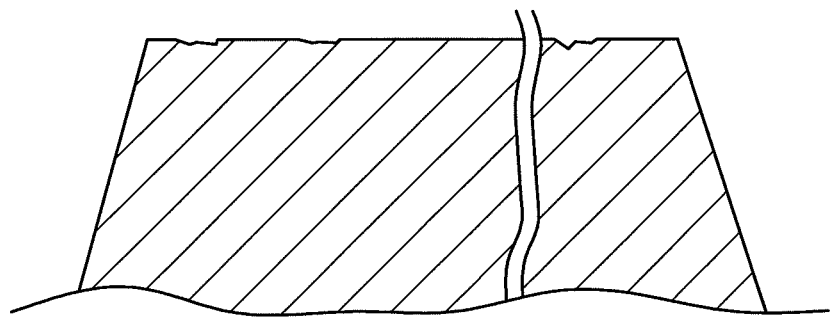
FIG. 6 is an enlarged view of a crest of convexities of the first member and the second member shown in FIG. 4.

In addition to providing smooth flat sliding surfaces, the first member 50 and the second member 52 should be made from materials selected to provide smaller original undulations and a smaller difference in Young's modulus, so that the crests of the convexities 56a, 56b become smoother after the first member 50 and the second member 52 have slid against each other, as shown in FIG. 6.

FIG. 7 is a graph showing a relationship between sums of the thermal conductivities and the boundary transition loads of two objects, i.e., disks 38 (first members) made of AC2B or SKD11, and test pieces 32 (second members) made of various materials. The graph includes a horizontal axis representing the sums of the thermal conductivities of the disks 38 and the test pieces 32, and a vertical axis representing the boundary transition loads of the disks 38 and the test pieces 32. In FIG. 7, the square-shaped marks (■) represent results of the disks 38 made of AC2B, whereas the lozenge-shaped marks (♦) represent results of the disks 38 made of SKD11. The materials of the test pieces 32 are shown in FIG. 7.

As can be understood from FIG. 7, as the sum of the thermal conductivities becomes greater, the boundary transition load also is made greater, i.e., a large load is required to bring the disk 38 (first member) and the test piece 32 (second member) into direct contact with each other.

Stated otherwise, if the sum of the thermal conductivities of the first member 50 and the second member 52 is set to 350 W/m·K or greater, and the first member 50 and the second member 52 are made of metals having a high melting point, then it is easy to maintain a prescribed clearance between the first member 50 and the second member 52, and a lubricant can be retained within such a clearance.

For the above reasons, the lubricant is suitably retained between the first member 50 and the second member 52, so as to provide an appropriate lubricating capability between the first member 50 and the second member 52.

Figure 8:
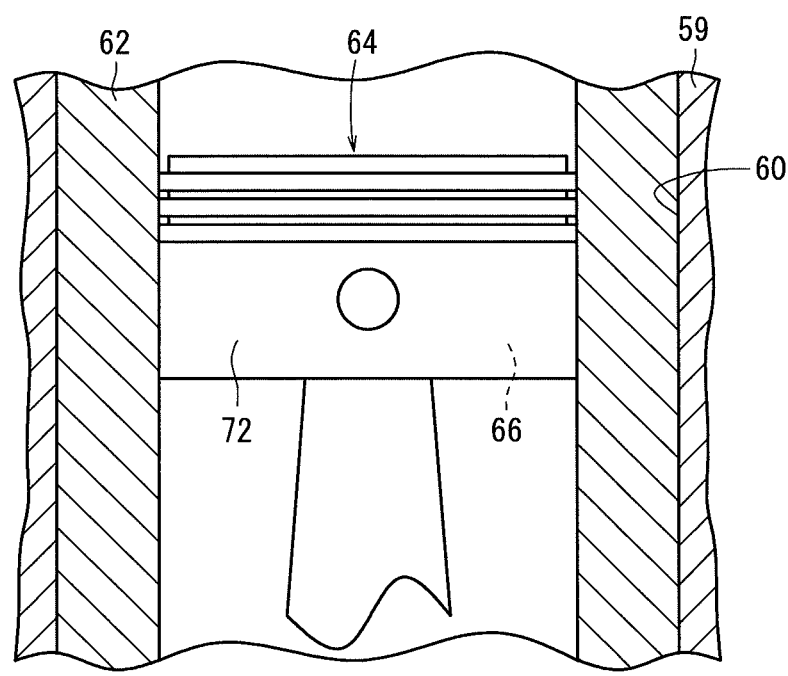
FIG. 8 is a fragmentary vertical cross-sectional view of an internal combustion engine, including a sleeve and a piston according to an embodiment of the present invention.

According to the present embodiment, based on the above results, an internal combustion engine, which is fragmentarily shown in FIG. 8, may be provided, in which the sum of the thermal conductivities of sliding regions of members that slide against each other is set to 350 W/m·K or greater, and in which the absolute value of the difference between respective Young's moduli of the sliding regions is set to 10 GPa or greater. Details of the internal combustion engine, which is fragmentarily shown in FIG. 8, will be described below.

FIG. 8 is a fragmentary vertical cross-sectional view of an internal combustion engine. The internal combustion engine includes a cylinder block 59 having, in general, a plurality of bores 60 defined therein that serve as cylinders, and a plurality of sleeves 62 inserted in the respective bores 60. An internal combustion engine piston (hereinafter also referred to simply as a "piston") 64 undergoes reciprocating movement in each of the sleeves 62.

The piston 64 has a piston skirt 66, which is held in sliding contact with an inner wall surface of the sleeve 62. The sleeve 62 and the piston skirt 66 jointly make up a sliding structure.

The sleeve 62 is generally made of gray cast iron (a so-called FC sleeve). However, the sleeve 62 may be made of an aluminum alloy (a so-called Al sleeve). The inner wall surface of the sleeve 62 may be surface-treated with a plated Ni—SiC coating, or a diamond-like carbon (DLC) coating.

Figure 9:
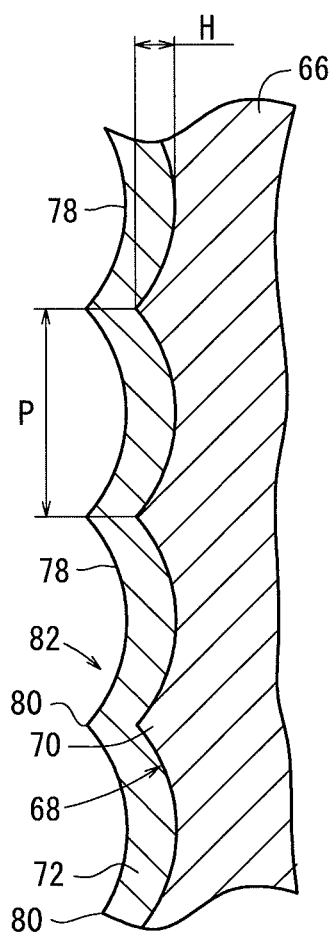
FIG. 9 is an enlarged cross-sectional view of a surface layer region of a piston skirt of a piston.

The piston 64 is made of AC2A, AC2B, AC4B, AC4C, AC4D, AC8H, or A1100 (an aluminum alloy defined by JIS), or an aluminum alloy such as an Al—Cu alloy or the like. As shown in FIG. 9, the piston skirt 66 has line marks 68 that extend along the circumferential direction thereof. The line marks 68 include ridges 70 having a height H in the range from 0.001 to 0.1 mm. The interval between adjacent ridges 70, i.e., a pitch P, is in the range from 0.1 to 0.5 mm. The height H more preferably is in the range from 0.008 to 0.012 mm, and the pitch P more preferably is in the range from 0.25 to 0.3 mm.

The piston skirt 66 thus constructed is covered with a lubricating layer (silver coating) 72. The lubricating layer 72 has a thickness that is not limited to any particular value. However, if the thickness of the lubricating layer 72 is excessively small, then the lubricating layer 72 will wear out within a relatively short period of time, tending to expose the piston skirt 66 as a base. On the other hand, if the thickness of the lubricating layer 72 is excessively large, then the lubricating layer 72 becomes so heavy that a large drive force is required to cause the piston 64 to undergo reciprocating movement. In order to avoid the above difficulties, the thickness of the lubricating layer 72 preferably is in the range from 0.5 to 100 μm.

Figure 10:
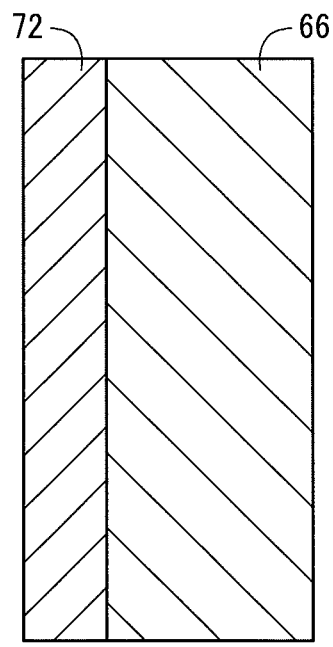
FIG. 10 is an enlarged cross-sectional view of a surface layer region of a piston skirt, which includes a lubricating layer made of metal.

According to the present embodiment, the lubricating layer 72 contains silver (Ag). The lubricating layer 72 may be provided as a metal layer of Ag, as shown in FIG. 10, which illustrates a surface layer region of the piston skirt 66 at an enlarged scale. The lubricating layer 72 may be formed by processing the piston 64 before the piston 64 is assembled in an internal combustion engine, according to an etching process using an alkaline solution, a cleaning process using an oxide, two zinc substitution processes, and followed by a plating process. The plating process may employ a silver cyanide plating bath.

Figure 11:
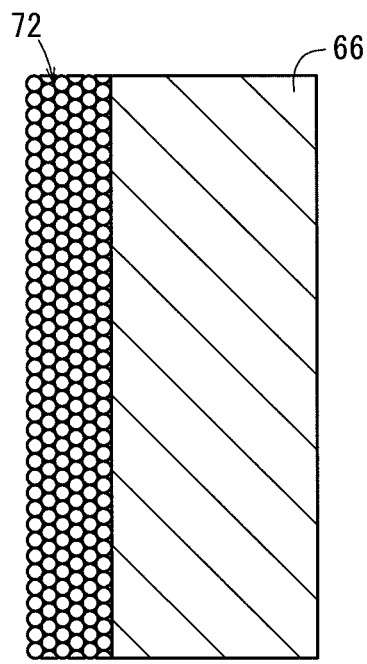
FIG. 11 is an enlarged cross-sectional view of a surface layer region of a piston skirt, which includes a lubricating layer made of sintered Ag particles.

Alternatively, as shown in FIG. 11, the lubricating layer 72 may be in the form of a sintered body produced from fine particles of silver as a starting material. In FIG. 11, the lubricating layer 72 is illustrated as a cluster of fine particles, so as to indicate the fine particles as a starting material. However, actually, the lubricating layer 72 comprises a three-dimensional structure made up of fused fine particles.

The fine particles preferably comprise so-called nanoparticles having an average diameter ranging from 1 to 80 nm. A lubricating layer 72 made up of nanoparticles is strongly bonded to the piston skirt 66 so as to prevent removal of the lubricating layer 72 from the piston skirt 66.

The nanoparticles are dispersed in a suitable solvent (preferably, a polar solvent) such as, for example, terpineol, nonanol, ethylene glycol, propylene glycol monomethyl ether acetate, methylethylketone, or the like, so as to prepare a slurry having a viscosity of about 10 cp.

Then, the piston skirt 66 is coated with the slurry using a known coating process such as screen printing or the like.

The piston 64, which has been coated with the slurry, is heated to a temperature ranging from 160 to 240° C. When the slurry is heated, the solvent in the slurry is volatilized and the nanoparticles are fused together. In other words, the slurry is sintered to result in a sintered body of silver particles that serves as the lubricating layer 72.

Use of nanoparticles makes it possible to form a coating by sintering the nanoparticles at a relatively low temperature in the range from 160 to 240° C. Therefore, the piston skirt 66, which is made of an aluminum alloy, is prevented from being heated to a high temperature and hence the mechanical strength thereof is prevented from being adversely affected.

In order to increase the bonding strength between the lubricating layer 72 and the piston skirt 66, an intermediate layer may be interposed between the lubricating layer 72 and the piston skirt 66. The intermediate layer may be made of a material such as polyimide resin, polyamideimide resin, epoxy resin, nylon-6 resin, nylon-6,6 resin, or the like.

For forming the lubricating layer 72 from silver particles as a starting material, a material that is capable of swelling the resin of the intermediate layer, such as N-methylpyrrolidone, polyvinylpyrrolidone, trichloroethylene, carbon tetrachloride, or the like, preferably is selected as a solvent to produce a slurry. When the intermediate layer is coated with the slurry so as to form the lubricating layer 72, the intermediate layer becomes swollen due to the solvent, thereby forming an intermixed layer in which silver particles are dispersed at an interface between the intermediate layer and the slurry. The intermixed layer develops and produces an anchoring effect between the intermediate layer and the lubricating layer 72 in order to bond the lubricating layer 72 firmly to the intermediate layer.

The lubricating layer 72 may comprise a plated layer of silver alloy or a coating of fine particles of silver alloy. The plating conditions may also be changed to form a plated layer of silver alloy, or fine particles of silver alloy may be used instead of fine particles of silver. In this case, suitable silver alloys include an Ag—Sn alloy and an Ag—Cu alloy.

The sum of the thermal conductivities of the lubricating layer 72 and the FC sleeve or the Al sleeve is 350 W/m·K or higher. The absolute value of the difference between the Young's modulus of the lubricating layer 72 and the Young's modulus of the FC sleeve or the Al sleeve is 10 GPa or greater.

In any of the above lubricating layers 72, the silver therein preferably has a purity represented by 60% by weight or higher. If the purity of silver is less than 60% by weight, then the thermal conductivity of the lubricating layer 72 becomes slightly lower, making it difficult to form a smooth worn surface, and there is a tendency for the lubricating layer 72 to be less effective at reducing frictional loss (Psf) in the internal combustion engine.

Figure 12:
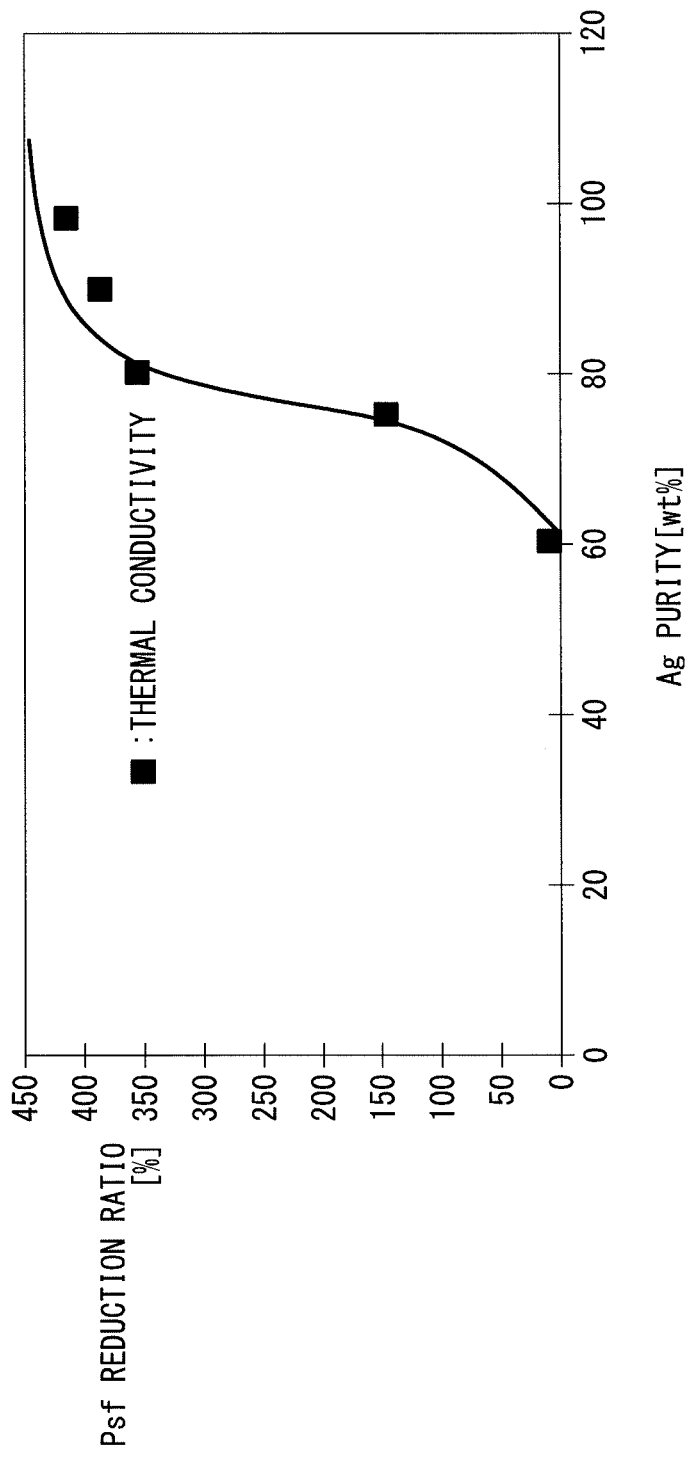
FIG. 12 is a graph showing a relationship between purities of silver, thermal conductivities of silver coatings (lubricating layers), and frictional losses in an internal combustion engine.

As can be seen from FIG. 12, if the purity of silver is 80% by weight or higher, then the reduction ratio of the thermal conductivity and the reduction ratio of the frictional loss are constant. Therefore, it is particularly preferable for the purity of silver to be set at 80% by weight or higher.

The purity of silver is defined as "the % by weight of silver contained in the lubricating layer 72". If the lubricating layer 72 is formed by a plating process (see FIG. 10), then the component contained in the lubricating layer 72 is almost pure silver, and hence the purity of silver is about 100%. If the lubricating layer 72 is formed of a silver alloy, then the purity of silver is determined as the % by weight of the silver contained in the lubricating layer 72. If the lubricating layer 72 (see FIG. 11) is formed as a sintered body after the piston skirt 66 has been coated with silver particles (nanoparticles), then the purity of silver is defined as the proportion of silver particles in the slurry.

The lubricating layer 72 may comprise a plated coating of copper, a coating in the form of a sintered body of fine particles of copper, a plated coating of copper alloy, or a coating in the form of a sintered body of fine particles of copper alloy. At any rate, the sum of the thermal conductivities of the lubricating layer 72 and the FC sleeve or the Al sleeve is 350 W/m·K or higher, and the absolute value of the difference between the Young's modulus of the lubricating layer 72 and the Young's modulus of the FC sleeve or the Al sleeve is 10 GPa or greater. The purity of copper in the copper alloy preferably is 70% or higher, and more preferably, is 80% or higher. Similar to the definition for the purity of silver, the purity of copper is defined as "the % by weight of copper contained in the lubricating layer 72".

A shape corresponding to the shape of the line marks 68 (see FIG. 9) on the piston skirt 66 is transferred to the upper end surface of the lubricating layer 72. More specifically, an undulation 82 having recesses 78 and ridges 80 positionally aligned with the recesses and ridges of the line marks 68 is formed on the lubricating layer 72. The height difference between the lowest valleys of the recesses 78 and the highest crests of the ridges 80 preferably is in the range from 0.001 to 0.1 mm, and more preferably, is in the range from 0.008 to 0.012 mm. Also, the interval between adjacent ones of the ridges 80, i.e., a pitch P, preferably is in the range from 0.1 to 0.5 mm, and more preferably, is in the range from 0.25 to 0.3 mm.

Lubricating oil (not shown) exists between the piston skirt 66 or the lubricating layer 72, which are formed as described above, and the sleeve 62. When the internal combustion engine operates, the piston 64 moves reciprocally and vertically within the sleeve 62, as shown in FIG. 8. The phrase "the internal combustion engine operates" implies that fuel is combusted in the combustion chamber.

While the piston 64 undergoes reciprocating movement, the undulation 82 (see FIG. 9) of the lubricating layer 72 is held in sliding contact with the inner wall surface of the sleeve 62. In this manner, the crests of the ridges 80 of the undulation 82 become suitably worn.

Figure 13:
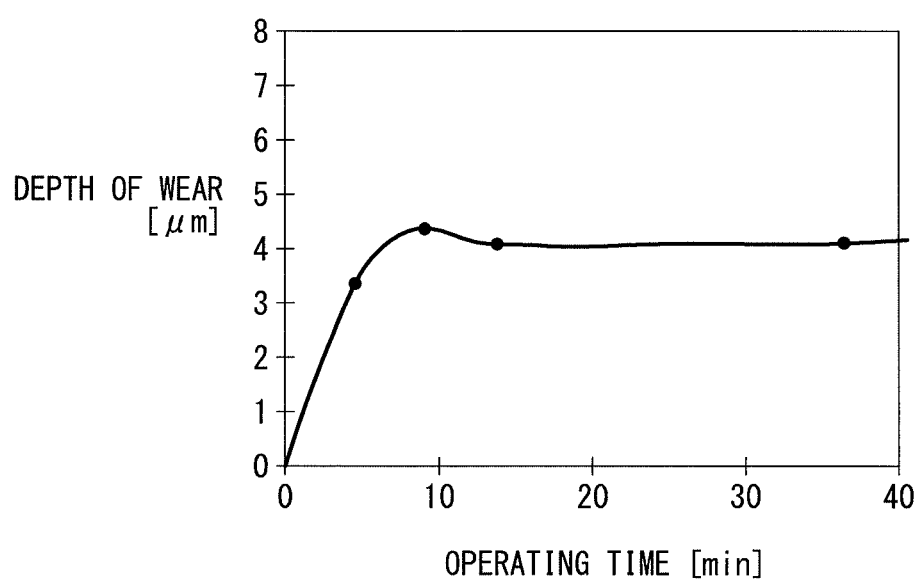
FIG. 13 is a graph showing how the depth of wear of a coating changes when an internal combustion engine operates at 6800 rpm.

When the internal combustion engine operates for a prescribed time, the crests are flattened to such an extent that the crests cannot be worn anymore. More specifically, as shown in FIG. 13, the depth of wear remains unchanged even as time passes. Stated otherwise, the depth of wear reaches a saturated value. FIG. 13 shows how the depth of wear changes when the internal combustion engine operates at 6800 rpm. It can be seen from FIG. 13 that the depth of wear reaches a saturated value in about 20 minutes. Subsequently, the "operation until the depth of wear reaches a saturated value" may be expressed as an "initial operation".

Figure 14:
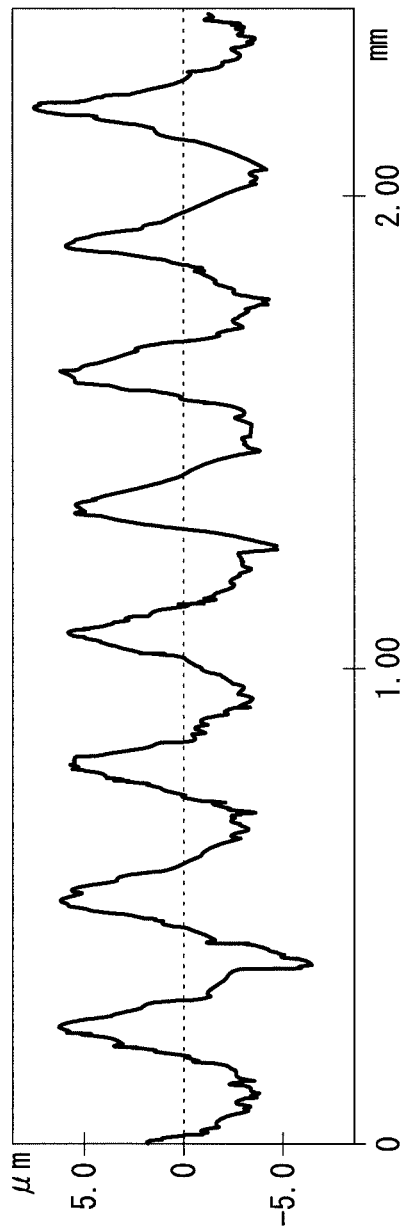
FIG. 14 is a diagram showing a roughness curve of the undulation of a silver coating (lubricating layer) prior to reciprocating movement (sliding movement) thereof.
Figure 15:
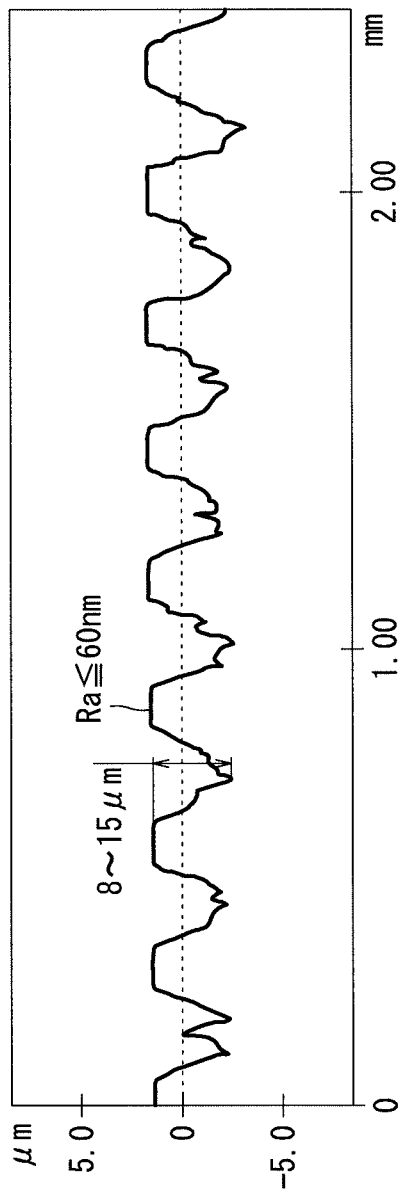
FIG. 15 is a diagram showing a roughness curve of the undulation of a silver coating (lubricating layer) subsequent to reciprocating movement (sliding movement) thereof.

The roughness curve of the undulation 82 prior to initial operation thereof, and the roughness curve of the undulation 82 subsequent to initial operation are shown respectively in FIGS. 14 and 15. It will be understood from a comparison of FIGS. 14 and 15 that, whereas the crests of the ridges 80 of the undulation 82 prior to sliding movement thereof are sharp, the crests of the ridges 80 of the undulation 82 subsequent to initial operation thereof, and when the depth of wear is saturated, have a flat smooth surface. Upon subsequent sliding movement thereof, the flat surface of the crests of the ridges 80 of the lubricating layer 72 functions as an actual sliding surface.

When an arithmetically averaged roughness Ra is measured with respect to the crests, which have been worn to a flat surface, it is confirmed that the lubricating layer 72, which is in the form of a plated copper coating, has an arithmetically averaged roughness Ra of about 55 nm, while the lubricating layer 72, which is in the form of a plated silver coating, has an arithmetically averaged roughness Ra of about 38 nm, each being smaller than 60 nm. The height difference between the lowest valleys of the recesses 78 and the highest crests of the ridges 80 is in the range from 8 to 15 μm.

Figure 16:
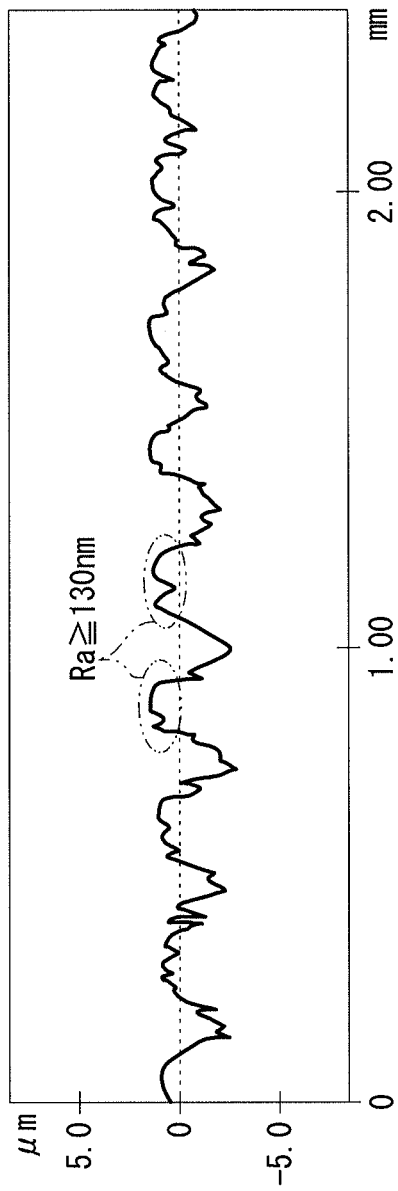
FIG. 16 is a diagram showing a roughness curve of the undulation of an $MoS_2$ coating (a lubricating layer according to the background art) subsequent to reciprocating movement (sliding movement) thereof.

FIG. 16 shows a roughness curve of the undulation of a conventional lubricating layer on a piston skirt, after the piston has been reciprocally moved through operation of an internal combustion engine. The lubricating layer has a thickness of 6 μm, with $MoS_2$ particles being dispersed in a binder resin of polyamideimide. The internal combustion engine operates for a period of time, which is the same as the period of time of initial operation of the internal combustion engine that incorporates the piston 64 therein.

As shown in FIG. 16, a conventional lubricating layer is recognized as having minute surface irregularities on the crests of the ridges of the undulation. More specifically, the crests of the ridges are not worn to a flat surface following sliding movement thereof. The arithmetically averaged roughness Ra of the crests is 130 nm at least and 140 nm at most, which is significantly greater than 60 nm. Only smooth regions of the crests of the ridges function as the actual sliding surface.

As readily understood from a comparison of the above roughness curves, according to the present embodiment, which has the lubricating layer 72 and in which the crests of the ridges 80 are worn to a smooth surface as a whole, the area of the region (hereinafter also referred to as an actual sliding surface) that functions as an actual sliding surface is greater than in the case of the conventional lubricating layer. When the internal combustion engine is operated again after an initial operation thereof, i.e., when the crests of the ridges 80 slide against the sleeve 62, the stress per unit area, which acts locally on the actual sliding surface, is reduced, since stresses are appropriately distributed due to the large area of the actual sliding surface.

According to the present embodiment, owing to the appropriate distribution of stresses, friction between the piston skirt 66 and the sleeve 62 is further reduced. Such reduced friction also contributes to a reduction in frictional loss.

In addition, since the pitch P of the line marks 68 and hence that of the undulation 82 preferably is in the range from 0.1 to 0.5 mm, and more preferably, is in the range from 0.25 to 0.3 mm, and the height H of the ridges 70 preferably is in the range from 0.001 to 0.1 mm, and more preferably, is in the range from 0.008 to 0.012 mm, the area of contact between the piston skirt 66 and the sleeve 62 lies within a suitable range. Consequently, sliding resistance is easily prevented from increasing and seizure is easily prevented from occurring.

Figure 17:
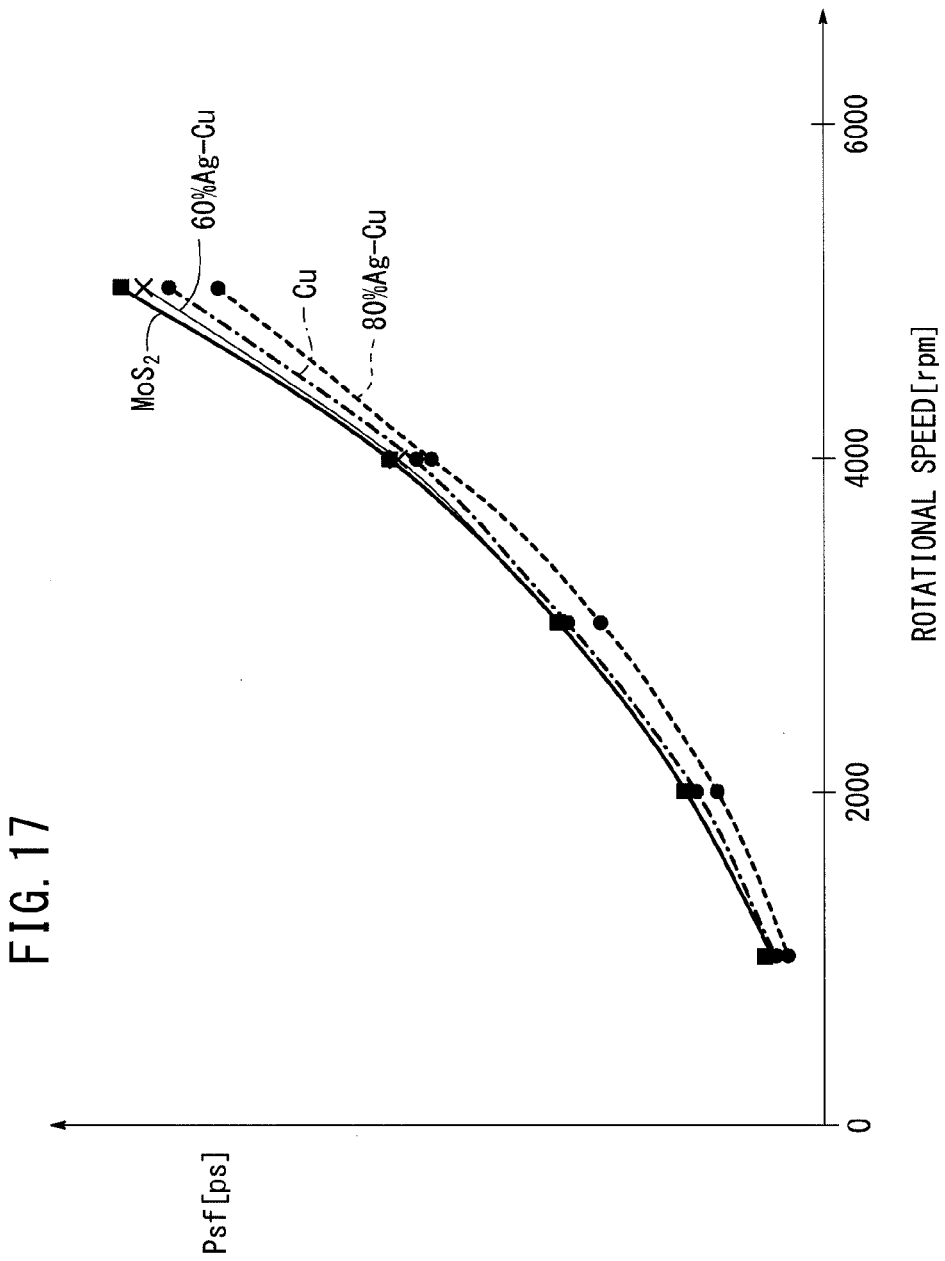
FIG. 17 is a graph showing a relationship between rotational speeds and frictional losses in an internal combustion engine, for cases in which pistons with various lubricating layers on piston skirts thereof are reciprocally moved.

FIG. 17 shows the frictional loss (Psf) of an internal combustion engine, at a time that the piston 64 is reciprocally moved, wherein the piston skirt 66 includes a lubricating layer 72 comprising a plated layer of an Ag—Cu alloy (silver purity of 80%) having a thickness of 6 μm, a lubricating layer 72 comprising a plated layer of an Ag—Cu alloy (silver purity of 60%) having a thickness of 6 μm, or a lubricating layer 72 comprising a plated layer of Cu (copper purity of 100%) having a thickness of 6 μm. The piston skirt 66 also has line marks 68 including ridges 70 having a height H of 0.01 mm and a pitch P of 0.3 mm. In addition, FIG. 17 shows the frictional loss of an internal combustion engine, at a time that the piston is reciprocally moved, wherein the piston skirt includes a conventional lubricating layer having a thickness of 6 μm with $MoS_2$ particles dispersed in a binder resin of polyamideimide. It is apparent from FIG. 17 that, at any rotational speed, the frictional loss of the piston 64 with the lubricating layer 72 containing Ag is smaller than the frictional loss of the piston with the lubricating layer containing $MoS_2$.

Figure 18:
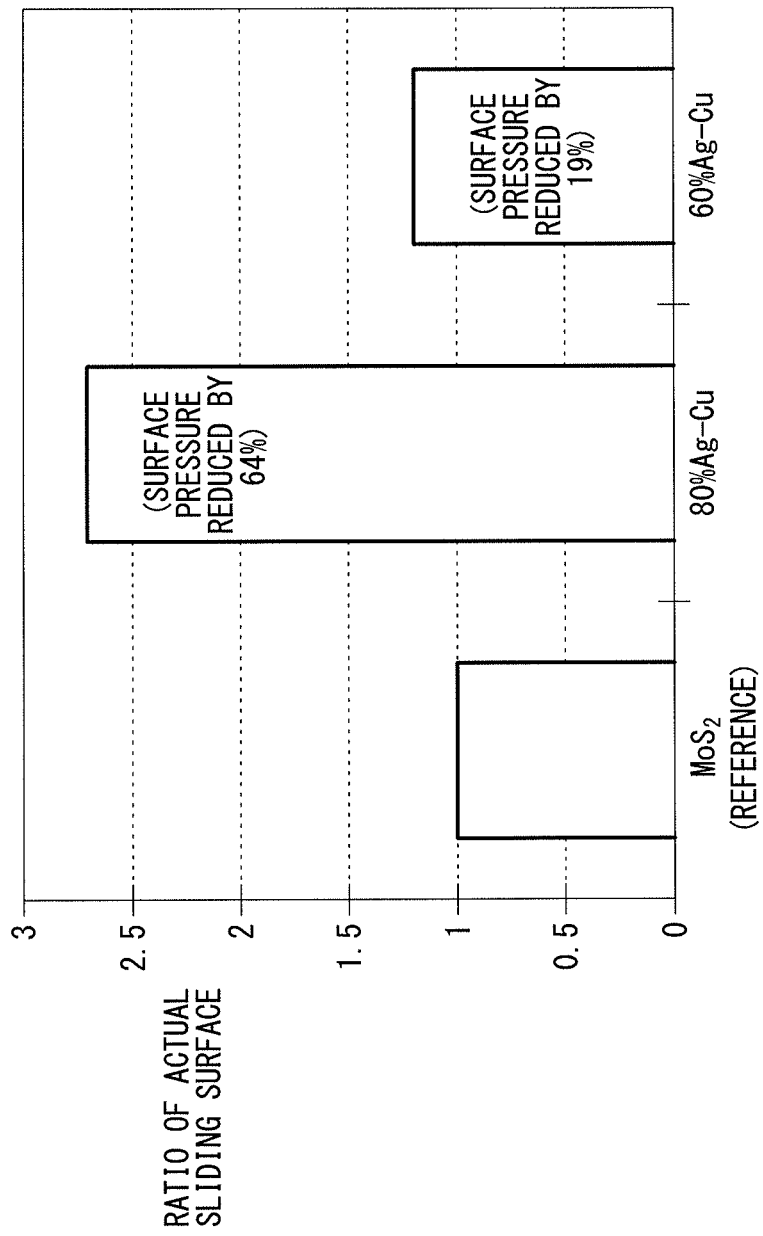
FIG. 18 is a graph showing, by way of comparison, the areas of regions, which function as actual sliding surfaces, of silver coatings, after pistons with various silver coatings (lubricating layers) on piston skirts thereof are reciprocally moved.

FIG. 18 is a graph showing, by way of comparison, the actual sliding surface after the piston 64 has been reciprocally moved, for a case in which the piston skirt 66 has a lubricating layer 72 comprising a plated layer of an Ag—Cu alloy (silver purity of 80%) and having a thickness of 6 μm, or a lubricating layer 72 comprising a plated layer of an Ag—Cu alloy (silver purity of 60%) and having a thickness of 6 μm, and wherein the piston 64 has the same line marks 68 as described above. Also shown is the actual sliding surface after the piston has been reciprocally moved, for a case in which the piston skirt includes a lubricating layer having a thickness of 6 μm with $MoS_2$ particles dispersed in polyamideimide. The actual sliding surface of the $MoS_2$ lubricating layer is assumed to be 1, and the ratios of the other actual sliding surfaces are illustrated in relation thereto.

It can be seen from FIG. 18 that the actual sliding surface of the lubricating layer 72 containing Ag is greater than the actual sliding surface of the Mo lubricating layer. The surface pressure of the lubricating layer 72 having a silver purity of 80% can be reduced by 64% of the surface pressure of the Mo lubricating layer. Further, the surface pressure of the lubricating layer 72 having a silver purity of 60% can be reduced by 19% of the surface pressure of the Mo lubricating layer.

It is apparent from the above results that the piston 64 having a lubricating layer 72 containing Ag can easily be moved reciprocally under relatively small forces, or stated otherwise, the piston 64 has a small sliding resistance. In other words, the above structure makes it possible to reduce the sliding resistance between the piston 64 and the sleeve 62. As a result, the drive force required to reciprocally move the piston 64 can be reduced.

Figure 19:
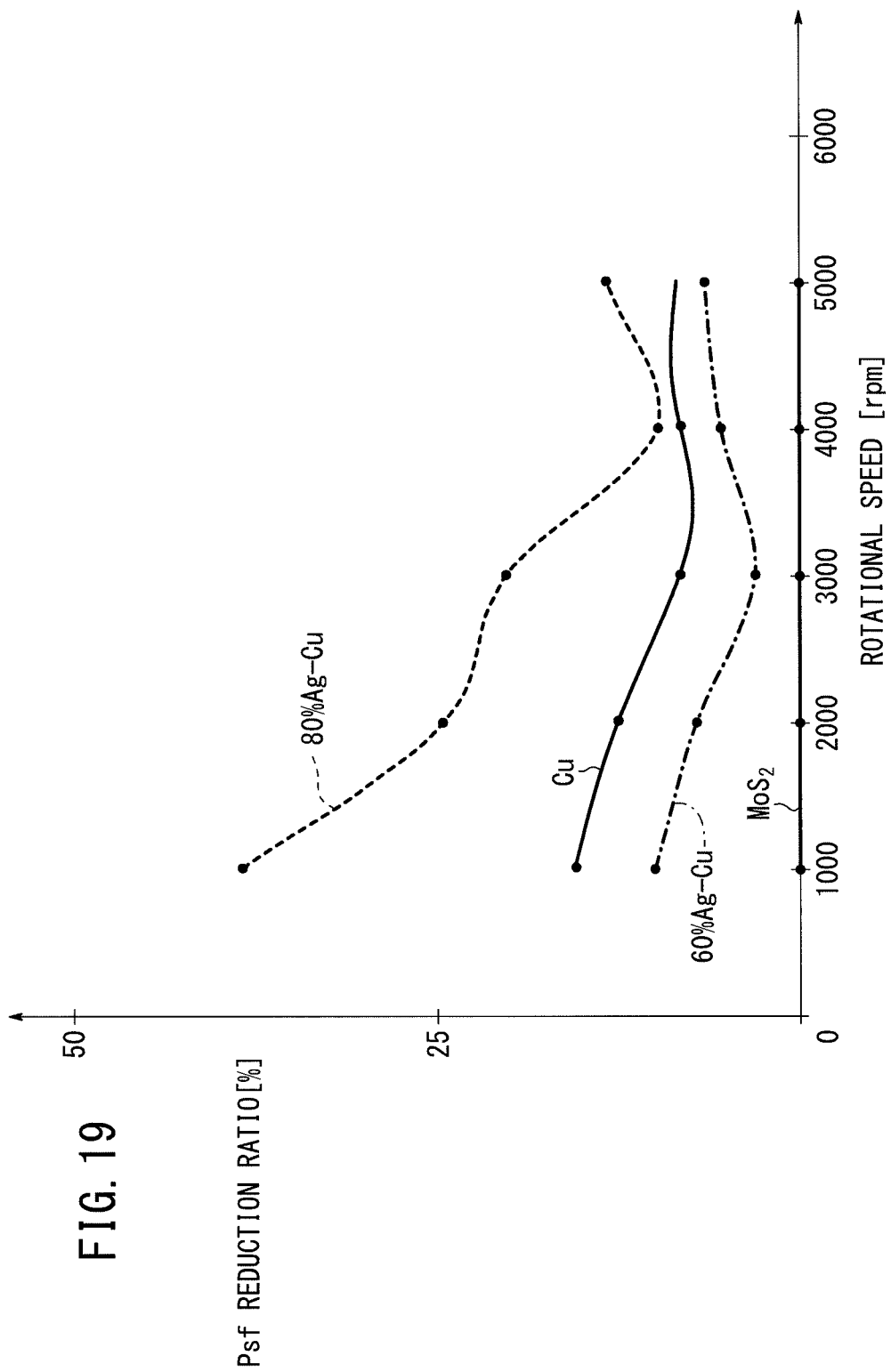
FIG. 19 is a graph showing a relationship between rotational speeds and reduction ratios of frictional losses in an internal combustion engine, for cases in which pistons having various lubricating layers on piston skirts thereof are reciprocally moved.

FIG. 19 shows reduction ratios of frictional losses with respect to rotational speeds of an internal combustion engine, against reference data concerning a piston with a lubricating layer containing $MoS_2$.

Figure 20:
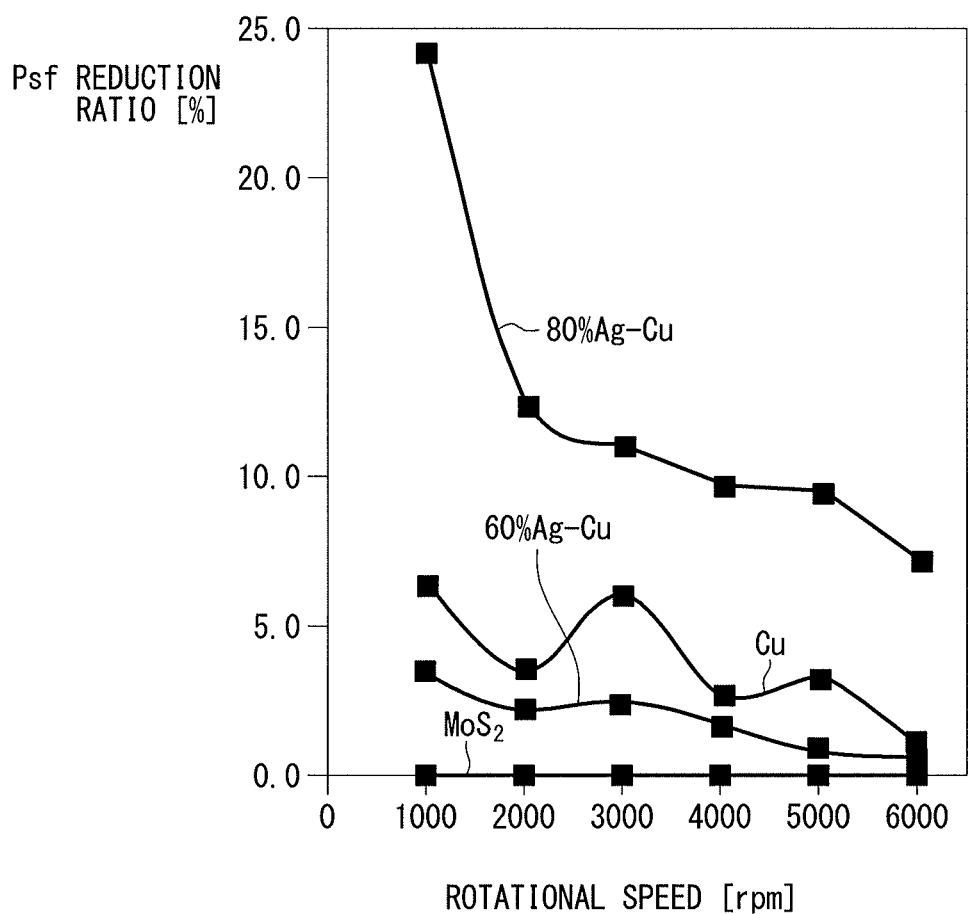
FIG. 20 shows the rotational speeds and the reduction ratios of frictional losses in an internal combustion engine, for cases in which pistons having various lubricating layers on piston skirts thereof are reciprocally moved under test conditions, which differ from those of FIG. 19.

FIG. 20 shows reduction ratios of frictional losses with respect to rotational speeds of an internal combustion engine under test conditions, which differ from those of FIG. 19. In FIG. 20, the reduction ratios also are shown against reference data concerning the piston, for a case in which the lubricating layer contains $MoS_2$.

As can be understood from FIGS. 19 and 20, at any rotational speed, the reduction ratios of the frictional losses of the pistons 64, in cases where the lubricating layer 72 contains Ag or the lubricating layer 72 contains Cu, are greater than the reduction ratio of the frictional loss of the piston in the case that the lubricating layer contains $MoS_2$. It can be clearly seen that the above structure is capable of increasing mileage, regardless of the rotational speed of the internal combustion engine.

It has also been found that a lubricating layer 72 in the form of a sintered body, which is produced from a starting material of silver particles having a diameter of 30 nm (purity of 88%), produces results indicating that the surface pressure is smaller and the reduction ratio of the frictional loss is greater than in the case of a lubricating layer containing $MoS_2$.

The present invention is not limited to the above embodiment, but various changes may be made to the embodiment without departing from the scope of the invention.

The invention claimed is:

1. A piston for an internal combustion engine, which is made of an aluminum alloy and is reciprocally movable in a sleeve made of gray cast iron or an aluminum alloy, comprising:
 a coating selected from the group consisting of silver, a silver alloy, copper, or a copper alloy, the coating covering line marks on a piston skirt, wherein:
 the coating includes a surface having an undulation therein including recesses and ridges;
 a height difference between lowest valleys of the recesses and highest crests of the ridges ranges from 8 to 15 μm; and
 a pitch between adjacent ones of the ridges corresponds to a pitch between ridges of the line marks, and the crests of the ridges have an arithmetically averaged roughness Ra of 60 nm or smaller,
 wherein the line marks are formed on an outer surface of the piston skirt on a side in sliding contact with the sleeve,
 wherein the sum of thermal conductivities of the coating and the sleeve is 350 W/m·K or higher, and the absolute value of the difference between the Young's modulus of the coating and the Young's modulus of the sleeve is 10 GPa or greater.

2. The piston according to claim 1, wherein the coating comprises a sintered body of particles of silver or copper.

3. The piston according to claim 1, wherein the coating is made of a silver alloy, with silver having a purity of 60% by weight or higher.

4. The piston according to claim 3, wherein the purity of the silver of the coating is 80% by weight or higher.

5. The piston according to claim 1, wherein the coating has a thickness ranging from 0.5 to 100 μlm.

6. The piston according to claim 1, wherein the line marks have a height ranging from 0.001 to 0.1 mm, and the pitch between adjacent ones of the ridges of the line marks ranges from 0.1 to 0.5 mm.

7. The piston according to claim 1, further comprising an intermediate layer interposed between the coating and the piston skirt, wherein the intermediate layer is made of any one of polyimide resin, polyamideimide resin, epoxy resin, nylon-6 resin, and nylon-6,6 resin.

8. The piston according to claim 1, wherein the ridges have a flat crest.

* * * * *